United States Patent
Kanevsky

[11] Patent Number: 6,044,344
[45] Date of Patent: *Mar. 28, 2000

[54] CONSTRAINED CORRECTIVE TRAINING FOR CONTINUOUS PARAMETER SYSTEM

[75] Inventor: Dimitri Kanevsky, Ossining, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/778,800

[22] Filed: Jan. 3, 1997

[51] Int. Cl.$^7$ ........................................................ G01L 9/00
[52] U.S. Cl. ................................. 704/256; 704/244
[58] Field of Search ..................... 704/231, 255, 704/256, 251; 714/244

[56] References Cited

FOREIGN PATENT DOCUMENTS 786761   7/1997   European Pat. Off. .......... G01L 5/06

OTHER PUBLICATIONS

Baum et al "A maximization technique occurring in the statistical analysis of probabilistic functions of markov chains" 1970, The annals of mathematics statistics, vol. 41, No. 1, pp. 164–171.

Kanevsky "A generalization of the Baum algorithim to functions on non-linear manifolds" May 1995, 1995 conference on acoustics, speech, and signal processing, vol. 1, pp. 473–476.

Salgado et al "Optimal power flow solutions using the gradient projection method" Nov. 1990, IEE proceedings, pp. 424–428.

Gopalakrishnan et al. An Inequality for Rational Functions with Applications to Some Statistical Estimation Problems, IEEE TRabsactions on Informatioon Theory, vol. 37 No. 1, Jan. 1991.

Deller "Discrete-time processing of speech signals" Prentice-Hall pp. 692,705–714,738, 1987.

Bahl et al "A maximum likelihood approach to continuous speech recognition" IEEE pp. 179–190, Mar. 1983.

*Primary Examiner*—David R. Hudspeth
*Assistant Examiner*—Harold Zintel
*Attorney, Agent, or Firm*—Whitham, Curtis & Whitham; Paul J. Otterstedt

[57] ABSTRACT

A method is provided for training a statistical pattern recognition decoder on new data while preserving its accuracy of old, previously learned data. Previously learned data are represented as constrained equations that define a constrained domain (T) in a space of statistical parameters (K) of the decoder. Some part of a previously learned data is represented as a feasible point on the constrained domain. A training procedure is reformulated as optimization of objective functions over the constrained domain. Finally, the constrained optimization functions are solved. This training method ensures that previously learned data is preserved during iterative training steps. While an exemplary speech recognition decoder is discussed, the inventive method is also suited to other pattern recognition problems such as, for example, handwriting recognition, image recognition, machine translation, or natural language processing.

6 Claims, 8 Drawing Sheets

CONSTRAINED CORRECTIVE TRAINING FOR CONTINUOUS PARAMETER SYSTEM

BACKGROUND OF THE INVENTION

1. Field of the Invention

The present invention generally relates to improvements in decoder accuracy in pattern recognition and, more particularly, to a method for exposing a pattern recognition decoder to new training data without losing previously learned data. The method disclosed is applicable in areas of pattern recognition such as speech, handwriting and image recognition, machine translation, natural language processing and the like.

2. Background Description

Automated pattern recognition is a difficult task. For example, while there are many techniques for recognizing speech patterns being studied today, the so-called Hidden Markov Modeling (HMM) proves promising. "Hidden" refers to the probabilistic and not directly observable events which underlie a speech signal. There have been many variations of HMM proposed. HMM speech recognition systems typically use realizations of phonemes which are statistical models of phonetic segments, including allophones (phones) having parameters that are estimated from a set of training examples. Models of words are made by chaining or linking appropriate phone models. Recognition consists of finding the most likely path through the set of word models for the input speech signal.

HMM speech recognition decoding systems first need to be trained through an iterative process. That is, the system must be repeatedly exposed to training examples or words of a particular speaker's voice. A training word is analyzed to generate a framed sequence of acoustic parameter vectors or statistical models. A valid or "good" recognition occurs when the most likely path through the set of word models for the training word results in recognizing the correct word (i.e., the training word itself).

Unfortunately, when a decoding system is being trained and is exposed to training data at some iterative stage, it may lose several good properties that were acquired in previous training stages. The maximum likelihood (or mutual information) of the parameters may not lead to values which maximize recognition accuracy. Alternative error corrective estimation procedures are known which aim to minimize the number of recognition errors. Such procedures imitate error correction procedures for linear classifiers where adjustments are made unless the log probability for the correct word exceeds the log probability of all other words by some threshold. This procedure is lacking a rigorous foundation and, in particular, it does not provide hill-climbing algorithms. This procedure also does not guarantee that other recognition errors will not be introduced while some particular "near miss" errors are being corrected.

SUMMARY OF THE INVENTION

It is therefore an object of the present invention to provide a way to train a decoder on new data while preserving its accuracy on old data.

According to the invention, some good features or previously learned data are represented as constrained equations that define a constrained domain in a space of statistical parameters of the decoder. Some part of a previously learned data is represented as a feasible point on the constrained domain.

"Good features" are some factors in a decoding procedure that lead to successful decoding of some "chunks" of phrases. These "chunks" can be either words that were decoded correctly, or sentences that were decoded correctly, or even phonemes in words that are always or mostly decoded correctly. For example, the decoder received as input an acoustic utterance corresponding the phrase "We obtained the bulk of the data from Broadcast News". Assume that the decoder decoded this utterance as "We obtained the BAN of the data from . . . News". Hence, the decoder decoded the sentence with two errors, one substitution, and one deletion. In this example words that were decoded correctly can be used to define "good features". These good features can be related to some factors in a space of statistical parameters of the decoder that may help to recognize correctly some words or phrases. The inequalities (1), below, provide a detailed example of factors related to "good features" (i.e., "good" sentences). The parameters in these inequalities depends on the training procedure. Different training procedures (e.g., different starting points) may lead to different parametric values in a decoder (e.g., different values of HMM in a decoder) after several iterations of forward-backward training steps. If inequalities (1) are satisfied for new values of training parameters then we are guaranteed that these "good" sentences will be decoded correctly by a decoder with these new parametric values (if other conditions, e.g. acoustic input utterance, remains the same).

A training procedure is reformulated as optimization of objective functions over the constrained domain. Finally, the constrained optimization problem is solved. This procedure incorporates a new error correcting strategy that, among other things, allows the use of hill-climbing algorithms and guarantees the error rate on old data is not increased. Hill-climbing algorithms guarantees that for each new iteration likelihood value is not decreasing (and typically increase until iterations started to converge to local maximum).

In a practical application, the invention is applied to training a continuous parameter speech recognition system. In this system, feature vectors resulting from the application of fast Fourier transform (FFT) analysis of a speech segment are input. These feature vectors are used to train the system whose output and probabilities are modeled by weighted sum of exponential functions with mean vectors and covariance matrices. Each path through the system gives rise to a likelihood score that is computed along this path. The best words (or candidate words) are chosen by a decoder as those that have highest likelihood scores along best paths (or as a sum of likelihood scores along all paths).

The fact that the best word is correct means that likelihood scores corresponding this word are higher than scores attached to other words. This property can be represented as a set of inequalities that involve means, covariances and weighted coefficients. This set of inequalities define a domain T in a parameter space K of means, covariances and weighted coefficients. Words are represented as points in this domain. This domain is not empty if the best word (corresponding to a point A) coincides with the correct word.

When an iterative step is made in the process of training, the means, covariances and weighted values are updated in accordance with a mathematical procedure that usually guarantees that the overall likelihood score for all words in a training script increases. The mathematical procedure is an algorithm for iterative finding of new points A1, A2, A3, . . . in a parameter space. For example Lalit R. Bahl et al. "Speech Recognitions with continuous-parameter hidden Markov models", IEEE 1998, p. 40–430), section 2, describes such-algorithm to maximize some functions, and is herein incorporated by reference.

During such an update, it can happen that the new best word (corresponding a point B) will not coincide with the correct word; i.e., the point B ∈ K does not belong to the domain T that is defined by the constraints. If the point A (corresponding the best word in a previous iterative training step) is an inner point of the domain T, then there is a linear interval I belonging T (and lying on a line connecting the point A with the point B) such that any point on this interval I has a higher likelihood score than the likelihood score corresponding to A. Repeating this step iteratively builds a set of models with increased overall likelihood scores while preserving error rate on the fixed input set of feature acoustic vectors V.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
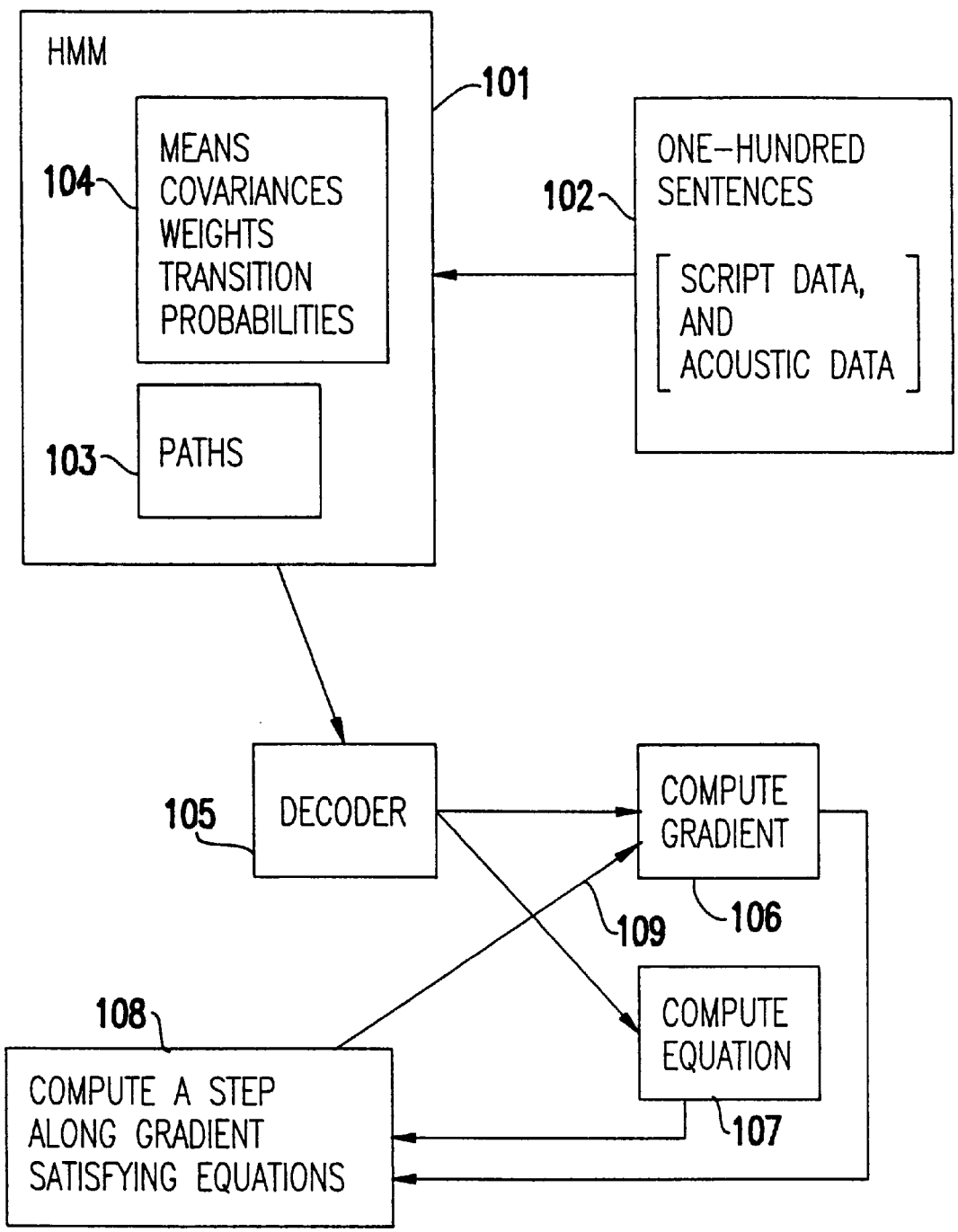
FIG. 1 is a block diagram illustrating the concept of constrained training that preserves the accuracy on a fixed input set of feature vectors according to the invention.

Referring now to the drawings, and more particularly to FIG. 1, there is shown by way of example how the method according to the invention is applied to a continuous speech recognizer. It is assumed that the speech training/decoder system comprises the following objects and modules. Referring to block 101, the training/decoding system uses mixtures of Gaussian densities in HMM output distributions. In the framework of maximum likelihood estimation (MLE) of HMM parameters, Gaussian mixture distributions are often seen as the best way of approximating as close as possible, the "true" underlying distributions.

This system requires consideration of the following data. First, some training data (e.g., one hundred sentences of spoken speech) is supplied by block 102. This data includes a training script (i.e., the one hundred sentences) and acoustic feature vectors corresponding these sentences. Within block 101, there is provided the best and general paths in HMM, represented by block 103. In addition, the parameter system (i.e., mean vectors, covariance matrices, weights, transition probabilities) is provided within block 101, as represented by block 104.

The training of the system according to the invention decodes data from HMM block 101 in decoder 105. A gradient is computed (training without constraints) in block 106. Computation of the equations that define the "constrained" domain over which the accuracy of the decoder 105 should be preserved in the next iterative steps is performed in block 107. Computation of a step of size a along a gradient for each Gaussian density is made in block 108. Finally, a parameter update is made by the loop 109. The fact that the decoder 105 performed well on some input data means that some inequalities for scores on input-output data are fulfilled. This set of inequalities forms constrained equations that we are trying to satisfy while we expose the decoder to a new training data.

Figure 2:
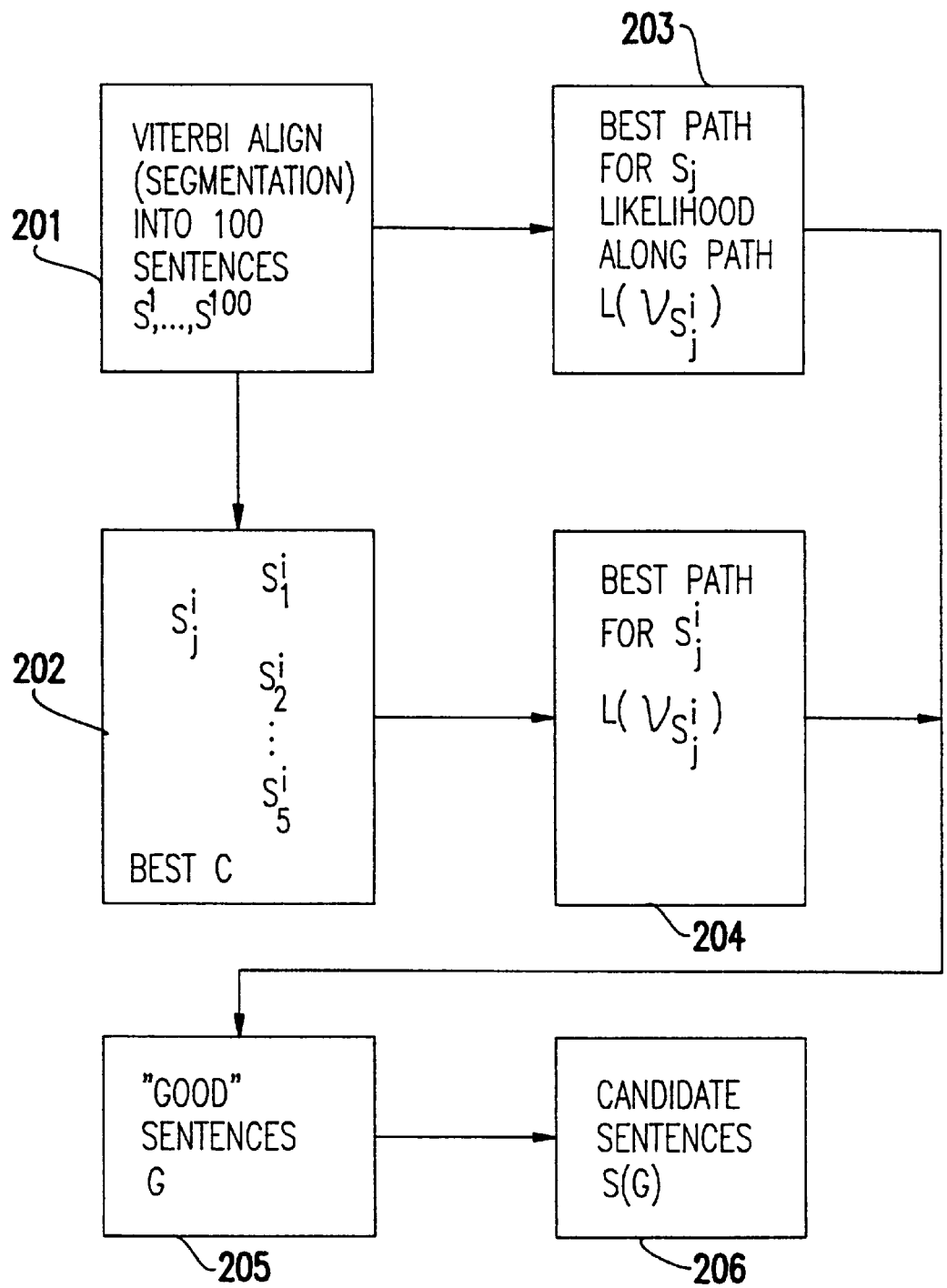
FIG. 2 is a flow diagram illustrating the decoding of data via the decoder shown in FIG. 1.

FIG. 2 illustrates how the decoder 105 decodes the input data. In the block 201, the input data (acoustic feature vectors) are divided into one hundred segments $A=\{a_i\}$ (using, for example the Viterbi alignment). Viterbi alignment is explained, for example, in Lait R. Ball et al., "A maximum likelihood approach to continuous speech recognition", IEEE Transaction on Pattern analysis and Machine Intelligence, vol. pami-5, no. 2, March 1983, Section V, and is herein incorporated by reference.

These segments correspond to the one hundred spoken sentences $S=\{s_i\}$ and are decoded using standard decoding methods. In block 202, for each sentence $s \in S$, the five best candidate sentences $S^{i=\{Si}_j\}$, (i=1, ..., 100, j=1, ..., 5) are found.

The best candidate sentences are obtained as follows. First, a set of candidate sentences are obtained by concatenating words from lists of candidate words. For each sentence $s_i$ in this list, a likelihood score, over the corresponding acoustic segment $\{a_i\}$, is computed. Five sentences with highest likelihood scores then are chosen.

In the block 203, the best path $v_{s_i}$ in a HMM set and the likelihood score $L(v_{s_i})$ along this path for each sentence $S_i \in S$ are computed. In block 204, the best path $v_{s_i}$ and the likelihood score $L(v_{s_i})$ along this path are computed for each sentence $S^i_j \in S^i$. Then in block 205, the subset G of "good" sentences is identified, $$G=\{s\in S|L(v_{s_i})-\epsilon>L(v_{s_j})\} \tag{1}$$

where i=1, ..., 100, j=1, ..., 5, ∈>0, $v_{s_i} \neq v_{s_j}$. "Good" sentences are those that were decoded correctly; i.e., their likelihood scores are higher than scores of candidate sentences. This situation is approximated by considering the inequalities (1) in which the likelihood of each correctly decoded sentence is larger than likelihoods of five "best" corresponding candidate sentences. In block 206, the list of candidate sentences is produced for each "good" sentence from (1):

$$S(G)=\{\cup S^i|s_i\nu G\} \tag{2}$$

Figure 3:
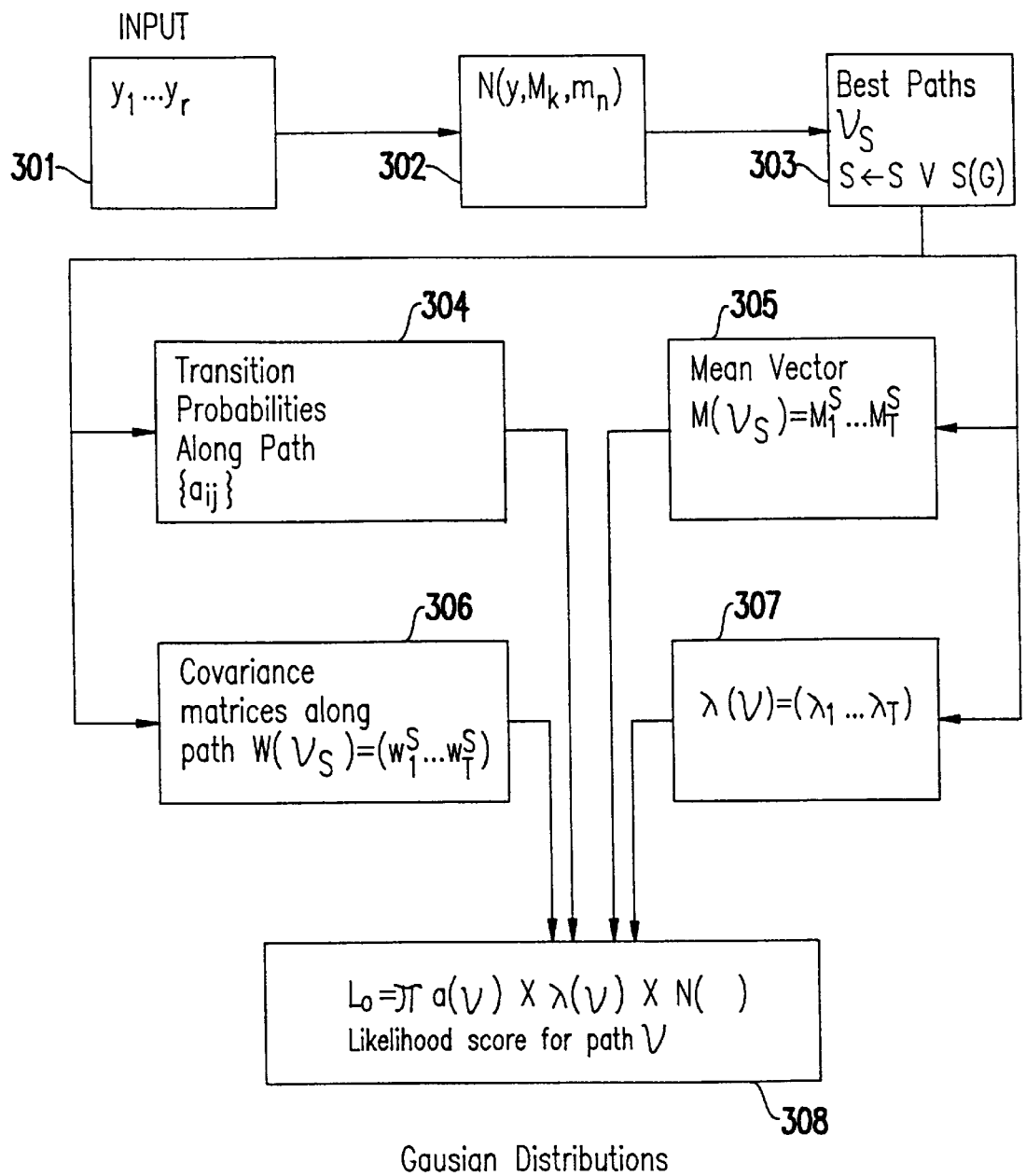
FIG. 3 is a flow diagram illustrating how the likelihood score for paths are computed in the practice of the invention.

FIG. 3 illustrates how the likelihood score for paths is computed. In block 301, the feature vector, $y=y_1^T=y_1 \ldots y_T$, is input. Block 302 contains a total set of Gaussian distributions for HMM: $N(Y; m_k; W_k)$, where $m_k$ and $W_k$ are means and covariance of $k^{th}$ Gaussian distribution, respectively. A general definition of Gaussian distribution is the following:

$$N(y;m;W)=w\times_e^-(y-m)'W(y-m) \tag{3}$$

where $$w = \frac{|W|^{\frac{1}{2}}}{(2\pi)^{\frac{n}{2}}}.$$

Block 303 contains best paths $v_s$ for each $s \in G \cup S(G)$ that were described in blocks 201 and 205 of FIG. 2. Block 304 contains transition probabilities along a path $v_s$: $a(v_s)=a_1 a_2 a \ldots a_T$, where $a_t$ denote a transition probability for a $t^{th}$ frame. Block 305 contains mean vectors (for most probable sub-mixtures along a path $v_s$):

$m(v_s) = (m^s_1, \ldots, m^s_T)$.

Block 306 contains covariance matrices (for most probable sub-mixtures along a path $v_s$): $W(v_s) = (W^s_1, \ldots, W^s_T)$. Block 307 contains weighted factors (for most probable sub-mixtures along a path $v_s$): $\lambda(v_s) = (\lambda_1, \ldots, \lambda_T)$. Likelihood score for a path $v$ and a feature string of vectors $y^T_1$ is computed according the following formulae:

$$L_\theta = \prod_{t=1}^{T} a(v_t) \times \lambda(v_t) \times N(y_t; m(v_t); W(v_t)) \quad (4)$$

Likelihood scores for the whole HMM set are computed as a sum of scores for all paths in HMM.

Figure 4:
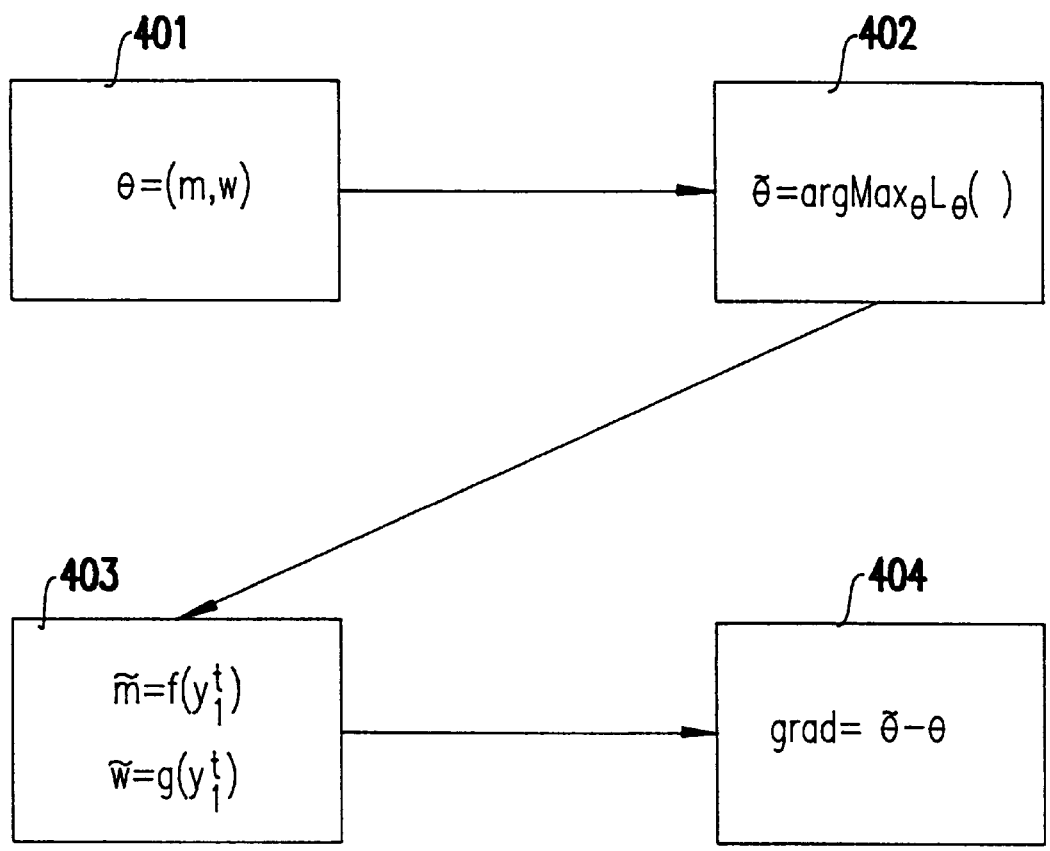
FIG. 4 is a flow diagram showing how a gradient is computed in the practice of the invention.

FIG. 4 illustrates how a gradient is computed. Let $\theta = (m_k, W_k)$ be the total set of mean vectors and covariance matrices in block 401. Using standard methods, one can find in block 402 new $\theta$:

$$\tilde{\theta} = (\tilde{m}, \tilde{W}) = argmax_\theta L_\theta(y^T_1) \quad (5)$$

Then in block 403, $$\tilde{m} = f(y^T_1) \text{ and } \tilde{W} = g(y^T_1),$$

where functions f() and g() are defined from standard training procedure for continuous parameters.

A standard training procedure is any (usually hill-climbing procedure) that finds new parameters by maximizing objective function (likelihood function) either without any constrains or using such typical constrains as probabilities which are non-negative and sum of probabilities=1. In the present invention, the likelihood function is maximized subject to non-typical constrains that come from requirement that some "good" properties were satisfied.

For continuous parameters, the standard training procedure involves maximizing, without constraints, the likelihood function that consists of sum of products of exponential expressions (equation (4)). The non-standard training procedure requires maximization of the same likelihood function subject non-standard constrains that are described, for example, in equation (7). Another example of standard procedure is described in "Maximization technique occurring in the statistical analysis of probable functions of Markov Chains", L. E. Baum et al., The Annals of Mathematical statistics, 1970, vol 41, No. 1, pp. 164–171— section 3, and section 4 (for continuous parameters), which is herein incorporated by reference.

Referring again to FIG. 4, the gradient in this iteration step is defined as difference of vectors $\theta - \tilde{\theta}$ in block 404.

The following mathematical statement is the basis for the computation of a step $\alpha$ along the gradient $\theta - \tilde{\theta}$ such that $\alpha \times (\theta - \tilde{\theta}) + \theta$ belongs to a manifold defined by constraints.

The following is a statement relates to the procedure for training a likelihood function subject to constraints according to the present invention:

Let $\alpha = (\alpha_k)$, $\alpha \in [0,1]$, where k are from the index set that parametrizes mean vectors and covariance matrices (one $\alpha$ for each Gaussian distribution). Let $\hat{\theta} = \theta(\alpha) = \{\tilde{m}(\alpha_k), \hat{W}(\alpha'_k)\}$ where $\tilde{m}_k(\alpha_k) = \hat{m}_k \alpha_k + (1-\alpha_k) m_k$ and $\hat{W}_k(\alpha'_k) = g(y_1^T, \tilde{m}_k(\alpha'_k))$ for any $\alpha_k$, $\alpha'_k$ such that $0 \leq \alpha'_k \leq \alpha_k \leq 1$, where $y_1^T$ is an input pattern vector, $m_k$ denotes a mean vector indexed by k, $\hat{m}_k$ denotes another mean vector indexed by k, $\hat{W}_k(\alpha'_k)$ denotes a covariance matrix indexed by k and dependent on a real number $\alpha'_k$, $\alpha = (\alpha_k)$ is a set of real numbers $\alpha_k$, where $0 \leq \alpha_k \leq 1$ and k are from the index set that parametrizes mean vectors and covariance matrices, $\tilde{m}_k(\alpha_k)$ denotes another mean vector that is obtained as weighted sum of mean vectors $\hat{m}_k$ and $m_k$, a vector $\tilde{m}(\alpha_k)$ depends on a real number $\alpha_k$ Then $L_{\hat{\theta}}(y_1^T) > L_\theta(y_1^T)$.

The above statement allows to split computation of means and covariances. First, means are updated to satisfy the equations. Then covariances are updated to satisfy the equations.

The new feature of our theorem is the fact that it can be used in the domain that is restricted by constraints. The training of continuous parameters require finding of two sets of parameters, that is, means and covariance. Given a set of means and covariance and the value of likelihood function at this set, we want to find a new meaning and covariance such that at this new set of means and covariance the value of likelihood function is not less than its values at the initial set. The statement allows one to do this. It provides a whole set of values for means and covariance (belonging to some interval) such that at any point of this interval the value of the likelihood function is not less than at the initial set of means and covariance. Since the initial set of means and covariance is a feasible point (i.e. belongs to the domain of parameters with "good" properties) some part of this interval also belongs to this constrained subdomain. Therefore one can choose a new mean-covariance set on this part of interval, such that on one hand, it belongs to the constrained subdomain, on the other hand, it is guaranteed that the value of likelihood function at this point is not decreasing.

Figure 5:
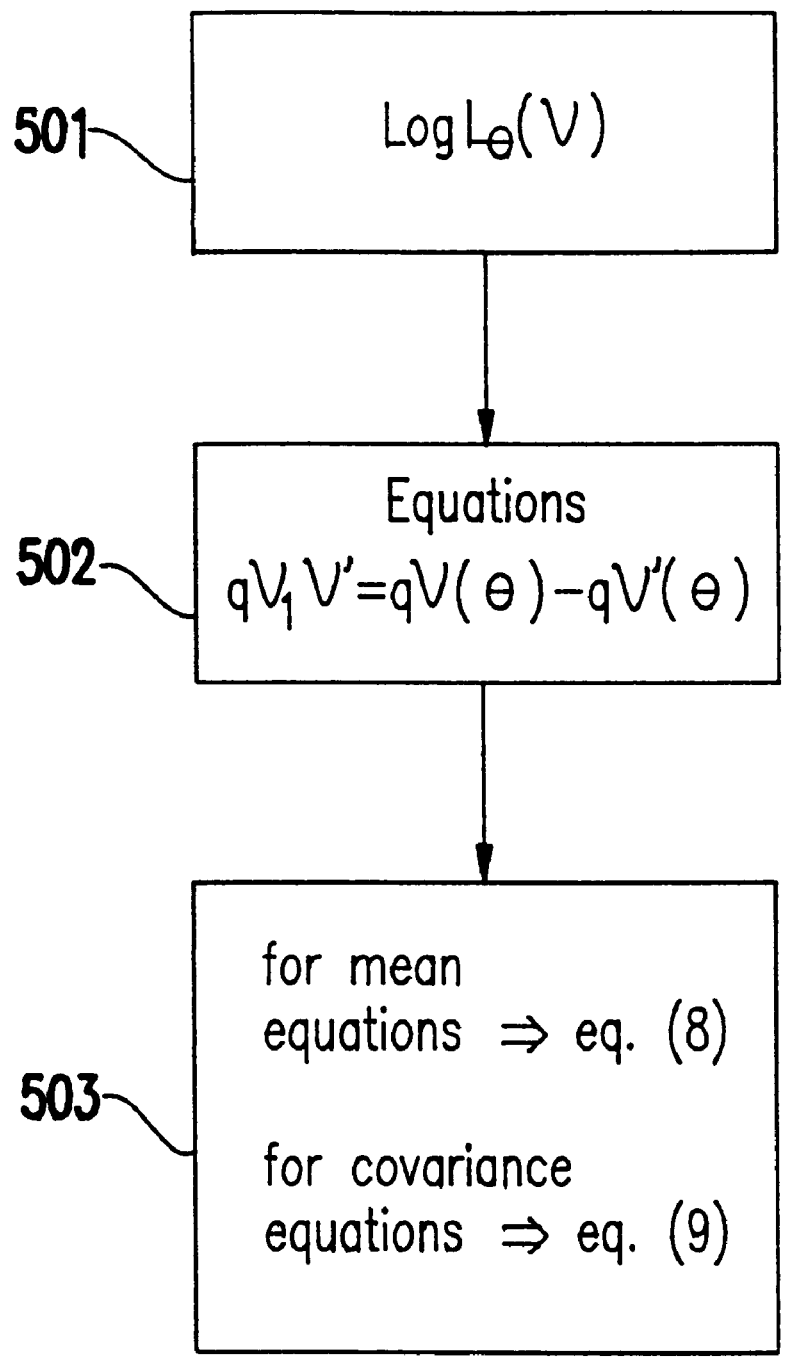
FIG. 5 is a flow diagram showing how constrained equations are computed in the practice of the invention.

FIG. 5 describes how constrained equations are computed. In block 501 log of (4) is computed.

$$q_v = \log L_\theta(v) = a(v) - \sum_v (y_t - m_k)' W_k (y_t - m_k) \quad (6)$$

where $$a(v) = \sum_1^T \log(a(v_t) \times \lambda(v_t) \times w_k)$$

and summation is taken along a path v. In block 502, for each corresponding pair of paths $v = v_s$, $s \in G$ and $v' = v'_s$, $s' \in S(G)$ the following equation from 1 is constructed:

$$q_{v,v'} = q_v(\theta) - q_{v'}(\theta) = a_{v,v'} + \sum_{v,v'} C_{t,k} \times (y_t - m_k)' W_k (y_t - m_k) > \in \quad (7)$$

Substituting in the above equations formulas $\tilde{m}_k(\alpha_k) = \hat{m}_k \alpha_k + (1-\alpha) m_k$ and $\hat{W}_k(\alpha'_k) = g(y_1^T, \tilde{m}_k, (\alpha'_k))$ produces the following two series of equations of $\alpha$ and $\alpha'$ generated in block 503:

$$\sum_{k \in (v_s, v'_{s'})} f_{v,v',k}(\alpha_k) \geq 0 \quad (s, s^j) \in G \times S(G) \quad (8)$$

and equations for covariances $$\sum_{k \in (v_s, v'_{s'})} g_{v,v',k}(\alpha'_k) \geq 0 \quad (s, s^j) \in G \times S(G) \quad (9)$$

These systems have solutions for $\alpha=0$, $\alpha'=0$. The task is to find some non-zero $\alpha$ that satisfies these equations. This $\alpha$ would provide a step along a gradient that is mentioned in the above Statement.

This system can be solved using iterative linearization or splitting equations in subgroups of equations (one system for each parameter if the number of parameters more than number of equations).

Figure 6:
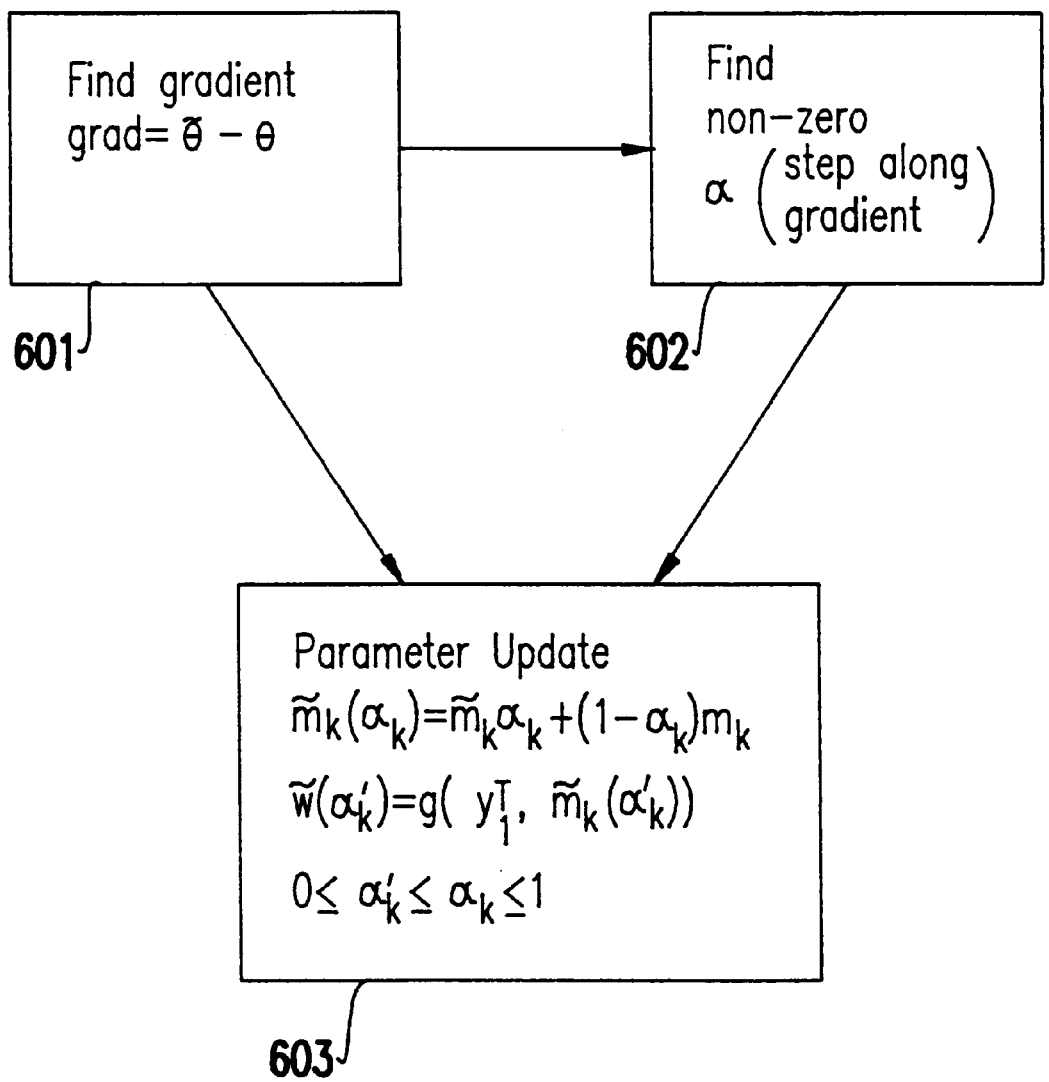
FIG. 6 is a flow diagram showing how parameters are updated in the practice of the invention.

In the FIG. 6, formula for parameter update is illustrated. Let $\tilde{m}_k$ be a set of means obtained via one standard iterative step starting from a set of means $\hat{m}_k$ (see for example (7) ). This defines the gradient grad=$\{\hat{m}_k - m_k\}$ as described in the FIG. 5 above. Using equations described in block 503 one can find non-zero $\hat{\alpha}$ that defines a step along this gradient and provide a parameters that satisfies equations in Block. 503. Let $\tilde{m}$=grad x $\hat{\alpha}$.

Then updated parameters can be computed as follows:

$$\hat{\theta}=\theta(\alpha)=\{\tilde{m}_k(\alpha_k), \hat{W}_k(\alpha'_k)\} \quad (10)$$

where $$\tilde{m}_k(\alpha_k)=\hat{m}_k\alpha_k+(1-\alpha_k)\, m_k \quad (11)$$

and $$\hat{W}_k(\alpha'_k)=g(y_1^T, \tilde{m}_k(\alpha'_k)) \quad (12)$$

for any $\alpha_k$, $\alpha'_k$ such that $0 \leq \alpha'_k \leq 1$.

For any $\alpha'_k$ in this interval an updated parameters are guaranteed not decrease an overall likelihood score in accordance with the Statement above. Because all updated parameters belong to the domain defined by equations in block 503 overall error rate over the data A=$\{a_i\}$ in block 201 will be not worsening. In other words, the present invention provides a method for updating decoding parameters in such a way that an overall likelihood increases and error rate on fixed set of input data does not increase.

Exact value of $\alpha_k$ can be chosen from several experiments on small data. Usually first iterations should take $\alpha'$ close to the $\alpha$ and when a local maximum is approached should take $\alpha'$ close to zero.

Figure 7:
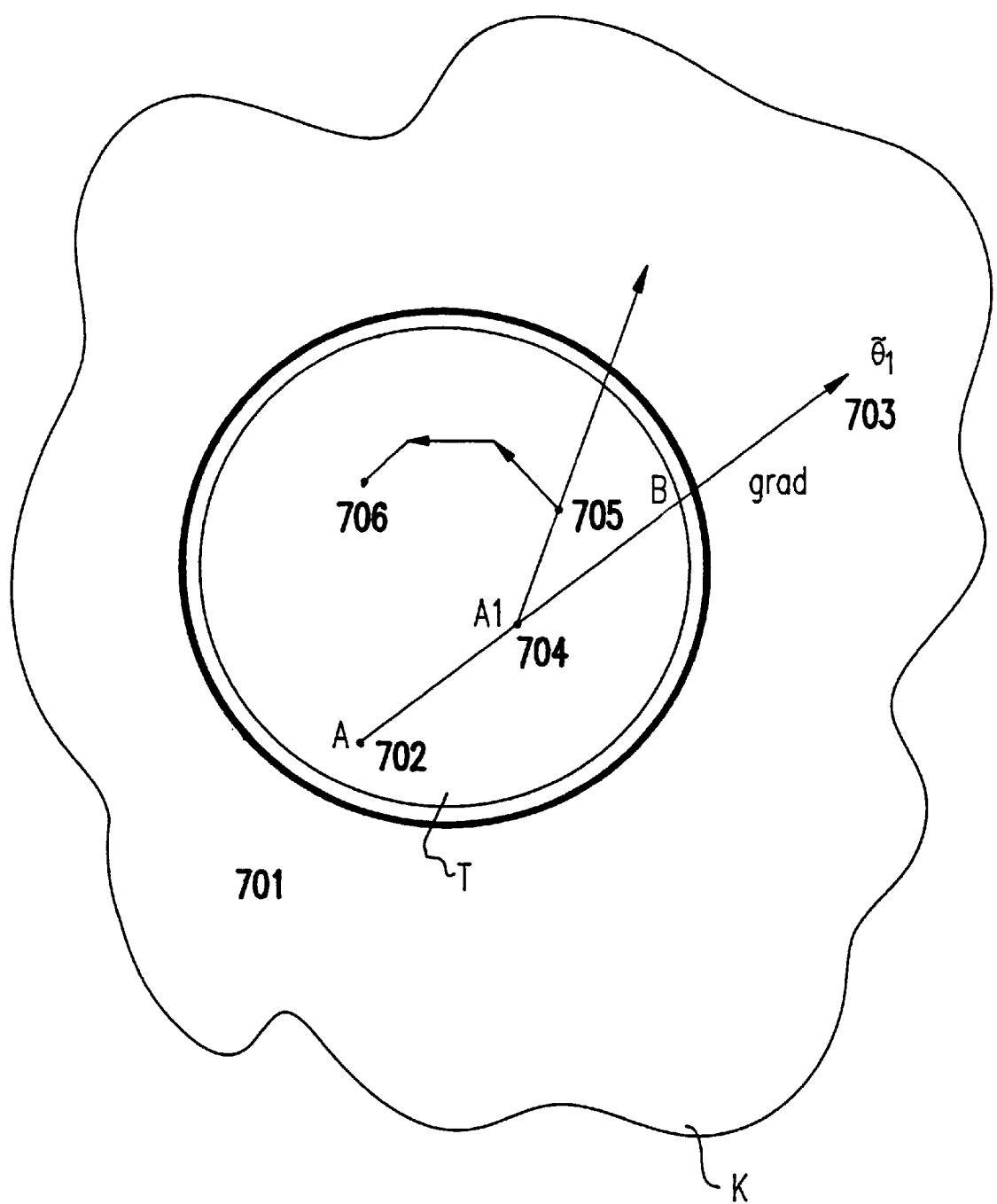
FIG. 7 is a path diagram illustrating several iterative steps according to one example of the invention.

FIG. 7 illustrates several iterative steps. Block 701 denotes a total area defined by constrained equations. Block 702 denote the started point. Block 703 denote the updated parameter obtained via standard iteration (without constrains). The interval between points 702 and 703 denotes a set of points at which the likelihood value of L() is not less than likelihood value at the initial point 702 The part of this interval (AB) belongs to the subdomain with "good" properties, therefore any point inside of this interval (e.g. 704) provides a point that guarantees that some "good" properties are satisfied. The Statement provides the method for finding the interval between 702 and 703 and the system of equations (9) can be used to find the subinterval AB with "good" properties. This point 703 lies outside the domain 701. The point 705 is chosen in this interval 703 for next iterative steps that is repeated similar the first one. All iterative steps provides points that converge to the local maximum 706.

Local maximum of some function L(x) in some manifold M is a point $\hat{x}$ such that in some small area U that includes this point $\hat{x}$ the value of the function L($\hat{x}$) at the point $\hat{x}$ is the largest in comparison with all other values L(x) at points x in the area U. It is usually impossible to find the "global" maximum—i.e. the point at which the likelihood function L(x) has the largest value over all manifold M. Usually one can try to find the "local" maximum—when the function is largest in some small area. This is done by using iterative methods.

Figure 8:
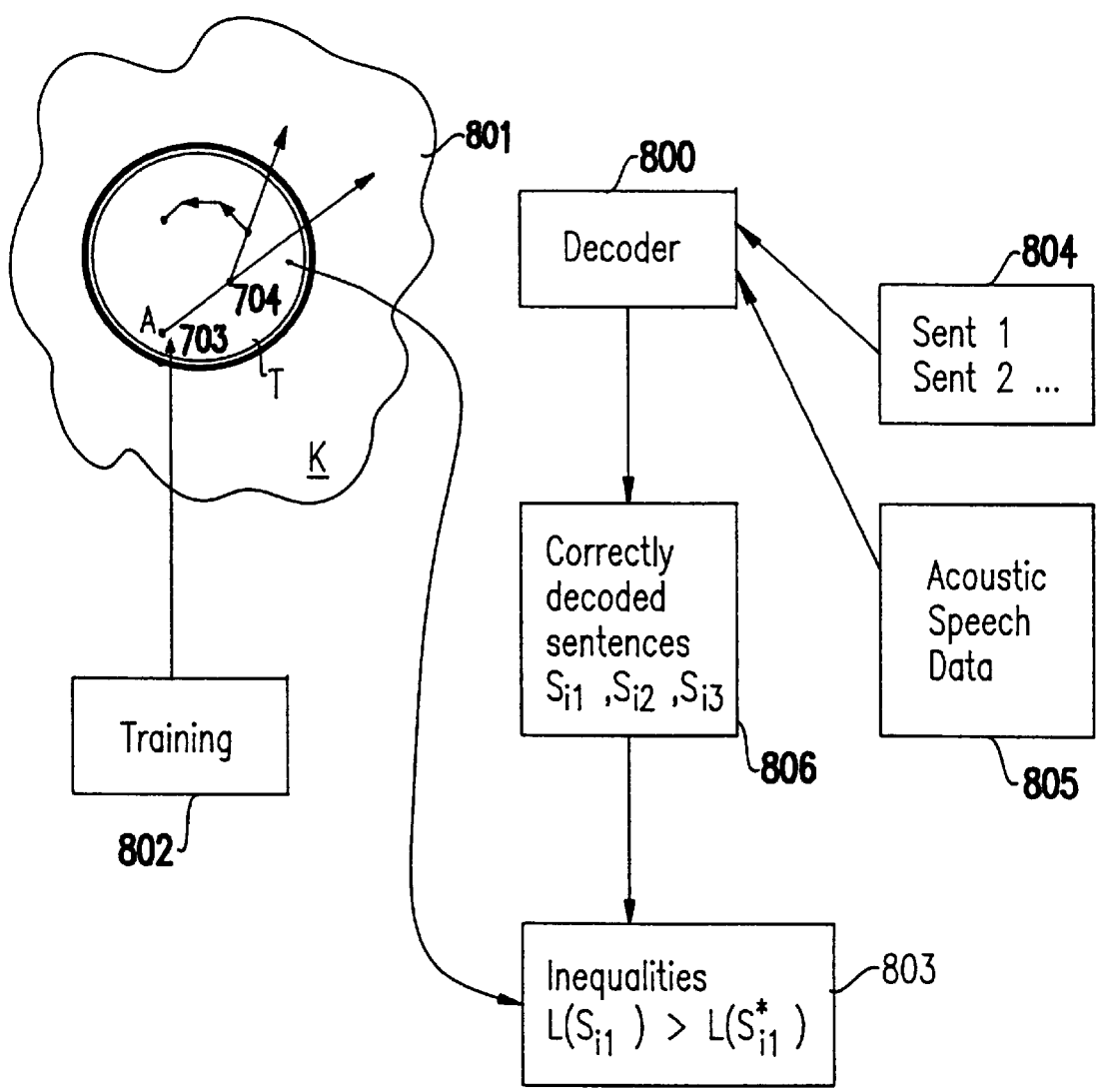
FIG. 8 is a flow diagram showing the training procedure and incorporating the path diagram of FIG. 7.

Referring now to FIG. 8, there is schematically illustrated "good" features, a constrained manifold, and a feasible point. Block 800 comprises a decoder that decodes speech input (block 805) that consists of sentences 1, 2, ... from block 804. The decoder 800 was trained by a training block 802 that chose some point (e.g., A) in a space of parameters 801 (space K). This space of parameters K of the decoder can be a set of means and covariance of Gaussian distributions such as those described in FIG. 3 at block 302.

Block 806 denotes correctly decoded sentences. That is, sentences that were decoded correctly when the decoder 800 was controlled by a parameter A (point A in a domain K), and decoded sentences with acoustic input from 805. These correctly decoded sentences give rise to set of likelihood inequalities. These inequalities define sub-domain T on the 801. Since the point A satisfies these inequalities, it belongs to the domain T and therefore is a feasible point on the domain (the feasible point is a mathematical notion that denotes any point that satisfies a set of inequalities in question). It is desirable to preserve in further training "good" properties—namely that sentences in block 806 decoded correctly for given acoustic input 805.

Since training may choose a new point in a statistical parameter space K (block 801, point B), in order to preserve above "good" property, one can request that all new points in a statistical parameter space should belong to domain T. If the domain T, then we are guaranteed that the decoder with a new value of parameters (corresponding this point B) will decode correctly the sentences from block 806 given acoustic input 805. The example of iterative training procedure that requires that all new points belong some subdomain are given in FIG. 7. This sub-domain A is an example of constrained manifold (that was obtained via constrains that correspond to likelihood inequalities in block 803.

While the invention has been described in terms of a single preferred embodiment, those skilled in the art will recognize that the invention can be practiced with modification within the spirit and scope of the appended claims.

I claim:

1. A computer implemented method of corrective training for a speech recognition system that is modeled by a continuous parameter system, comprising the steps of:

choosing a space of continuous parameter systems in which every point in said space gives rise to a separate continuous parameter system;

transforming a textual script and a sound message that was generated by a human speaker from said textual script into electrical signal representations;

producing from said electrical representations a system of constrained equations that define a domain T in said space of continuous parameter systems satisfying following:

said continuous parameter system comprises a point A, that satisfies said system of constrained equations;

said speech recognition system that is modeled by a continuous parameter system that corresponds to any point in said domain T decodes with not worse accuracy than said speech recognition system that is modeled by a continuous parameter system that corresponds to the point A;

representing a training procedure as a constrained optimization problem of a likelihood score function defined over said domain T; and finding a new continuous parameter system in T that solves said constrained optimization problem and constructing a new speech recognition system that is modeled by said new continuous parameter system, wherein said new continuous parameter system is used to recognize sound used in said new speech recognition system for recognition of sound messages or for repeating said method of corrective training with new speech data, wherein said step of finding a new continuous parameter system in T that solves said constrained optimization problem comprises the steps:

taking an iterative training step to find a point B, where B is in the space of said continuous parameter system, not necessarily contained in the constrained domain T;

taking an interval I to find a new data point belonging to the constrained domain T and lying on an interval connecting point A and point B, such that any point on the interval I has a higher likelihood score than the likelihood score corresponding to A; and repeating said step of taking an interval I to find a new data point until said new data point converges to a local maximum in the constrained domain T.

2. A computer implemented method of corrective training for a speech recognition system that is modeled by a continuous parameter system, comprising the steps of:

choosing a space of continuous parameter systems in which every point in said space gives rise to a separate continuous parameter system;

transforming a textual script and a sound message that was generated by a human speaker from said textual script into electrical signal representations;

producing from said electrical representations a system of constrained equations that define a domain T in said space of continuous parameter systems satisfying following:

said continuous parameter system comprises a point A, that satisfies said system of constrained equations;

said speech recognition system that is modeled by a continuous parameter system that corresponds to any point in said domain T decodes with not worse accuracy than said speech recognition system that is modeled by a continuous parameter system that corresponds to the point A;

representing a training procedure as a constrained optimization problem of a likelihood score function defined over said domain T; and finding a new continuous parameter system in T that solves said constrained optimization problem and constructing a new speech recognition system that is modeled by said new continuous parameter system, wherein said new continuous parameter system is used to recognize sound used in said new speech recognition system for recognition of sound messages or for repeating said method of corrective training with new speech data, wherein said likelihood scored function is increased via transformation of means and variances comprising the steps of:

letting, $\alpha=(\alpha_k)$, $\alpha \in$ where k are from the index set that parametrizes mean vectors and covariance matrices with one $\alpha$ for each Gaussian distribution; and letting $\hat{\theta}=\theta(\alpha)=\{\tilde{m}(\alpha_k),\hat{W}(\alpha'_k)\}$ where $\tilde{m}_k(\alpha_k)=\hat{m}_k\alpha_k+(1-\alpha_k)m_k$ and $\hat{W}_k(\alpha'_k)=g(y_1^T,\tilde{m}_k(\alpha'_k))$ for any $\alpha_k,\alpha'_k$ such that $0 \leq \alpha'_k \leq \alpha_k \leq 1$, where $y_1^T$ is an input pattern vector, $m_k$ denotes a mean vector indexed by k, $\hat{m}_k$ denotes another mean vector indexed by k, $\hat{W}_k(\alpha'_k)$ denotes a covariance matrix indexed by k and dependent on a real number $\alpha'_k$, $\alpha=(\alpha_k)$ is a set of real numbers $\alpha_k$, where $0 \leq \alpha_k \leq 1$ and k are from the index set that parametrizes mean vectors and covariance matrices, $\tilde{m}_k(\alpha_k)$ denotes another mean vector that is obtained as weighted sum of mean vectors $\hat{m}_k$ and $m_k$, a vector $\tilde{m}_k(\alpha_k)$ depends on a real number $\alpha_k$.

3. A method as recited in claim 2 further comprising the step of:

computing a likelihood function $L_{\hat{\theta}}(y_1^T) > L_\theta(y_1^T)$ over some paths to obtain likelihood scores for said paths;

identifying correctly decoded patterns having highest likelihood scores; and forming equations for said correctly decoded patterns to define constraints for said constrained optimization problem prior to said step of solving said constrained optimization problem.

4. A statistical decoder for corrective training for a continuous parameter system used for speech pattern recognition, comprising:

means for generating electrical signals from spoken script as training data;

means for representing said training data as constrained equations that define a constrained domain T in a space of statistical parameters of a statistical decoder;

means for representing said training data as a point A on the constrained domain T;

means for reformulating a training procedure as a constrained optimization problem of an objective function over the domain T; and means for solving the constrained optimization problem, wherein said means for solving, comprises:

means for taking an iterative training step to find a point B, where B is in the space of statistical parameters, not necessarily contained in the constrained domain T;

means for taking an interval I to find a new data point belonging to the constrained domain T and lying on a point connecting point A and point B, such that any point on the interval I has a higher likelihood score than the likelihood score corresponding to A; and means for repeating said step of taking an interval I to find a new data point until said new data point converges to a local maximum in the constrained domain T.

5. A statistical decoder for corrective training for a continuous parameter system used for speech pattern recognition, comprising:

means for generating electrical signals from spoken script as training data;

means for representing said training data as constrained equations that define a constrained domain T in a space of statistical parameters of a statistical decoder;

means for representing said training data as a point A on the constrained domain T;

means for reformulating a training procedure as a constrained optimization problem of an objective function over the domain T; and means for solving the constrained optimization problem, wherein said objective function is a Gaussian distribution, comprising:

letting $\alpha=(\alpha_k), \alpha \in$, where k are from an index set that parametrizes mean vectors and covariance matrices, with one $\alpha$ for each Gaussian distribution, letting $\hat{\theta}=\theta(\alpha)=\{\tilde{m}(\alpha_k),\hat{W}(\alpha'_k)\}$ where $\tilde{W}_k(\alpha_k)=\hat{m}_k\alpha_k+(1-\alpha_k)\ m_k$ and $\hat{W}_k(\alpha'_k)=g\ (y_1^T, \tilde{m}_k(\alpha'_k))$ for any $\alpha_k, \alpha'_k$ such that $0 \leq \alpha'_k \leq \alpha_k \leq 1$, where $y_1^T$ is an input pattern vector, $m_k$ denotes a mean vector indexed by k, $\hat{m}_k$ denotes another mean vector indexed by k, $\hat{W}_k(\alpha'_k)$ denotes a covariance matrix indexed by k and dependent on a real number $\alpha'_k$, $\alpha=(\alpha_k)$ is a set of real numbers $\alpha_k$, where $0 \leq \alpha_k \leq 1$ and k are from the index set that parametrizes mean vectors and covariance matrices, $\tilde{m}_k(\alpha_k)$ denotes another mean vector that is obtained as weighted sum of mean vectors $\hat{m}_k$ and $m_k$, a vector $\tilde{m}_k(\alpha_k)$ depends on a real number $\alpha_k$.

6. A statistical decoder for corrective training as recited in claim 5 further comprising:

means for computing a likelihood function $L_{\hat{\theta}}(y_1^T) > L_\theta (y_1^T)$ over some paths to obtain likelihood scores for said paths;

means for identifying correctly decoded patterns having highest likelihood scores;

means for forming equations for said correctly decoded patterns to define constraints for said constrained optimization problem; and means for solving said constrained optimization problem.

* * * * *